United States Patent
Galpin et al.

(10) Patent No.: US 10,523,980 B2
(45) Date of Patent: Dec. 31, 2019

(54) METHOD, APPARATUS AND STREAM OF FORMATTING AN IMMERSIVE VIDEO FOR LEGACY AND IMMERSIVE RENDERING DEVICES

(71) Applicant: THOMSON LICENSING, Issy les Moulineaux (FR)

(72) Inventors: Franck Galpin, Thorigné Fouillard (FR); Sebastien Lasserre, Thorigne-Fouillard (FR); Pierre Andrivon, Liffre (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/590,134

(22) Filed: May 9, 2017

(65) Prior Publication Data

US 2017/0339440 A1 Nov. 23, 2017

(30) Foreign Application Priority Data

May 23, 2016 (EP) .................................... 16305592

(51) Int. Cl.
*G06T 3/00* (2006.01)
*H04N 21/2343* (2011.01)
(Continued)

(52) U.S. Cl.
CPC ..... *H04N 21/234327* (2013.01); *G06F 3/012* (2013.01); *G06F 3/04815* (2013.01);
(Continued)

(58) Field of Classification Search
CPC ............................ G06T 3/0093; G06T 3/0087
See application file for complete search history.

(56) References Cited

U.S. PATENT DOCUMENTS 6,249,616 B1 * 6/2001 Hashimoto ............... G06T 7/35
345/427
8,730,130 B1 * 5/2014 Pray ...................... G03B 37/04
345/8

(Continued)

FOREIGN PATENT DOCUMENTS

JP 2010192971 9/2010
WO WO-2014170482 A1 * 10/2014 ........... G06T 3/0031
WO WO2015197818 12/2015

OTHER PUBLICATIONS

Thomas, "Moving Regions of Interest Signalling in MPD", International Organization for Standardization, ISO/IEC JTC1/SC29/WG11, Coding of Moving Pictures and Audio, MPEG 2016/m38032, San Diego, California, USA, Feb. 2016, pp. 1-11.

(Continued)

*Primary Examiner* — Phong X Nguyen
(74) *Attorney, Agent, or Firm* — Brian J. Dorini; Paul P. Kiel

(57) ABSTRACT

The present disclosure relates to methods, apparatus or systems for generating, transmitting and decoding a backward compatible immersive video stream. The stream is carrying data representative of an immersive video, composed of a frame organized according to a layout having a first area encoded according to a rectangle mapping, a second area encoded according to a mapping transitory from the rectangular mapping to an immersive mapping and a third area encoded according to the immersive mapping. In order to be backward compatible, the stream further includes first information representative of the size and the location of the first area within the video frame, and second information having at least the type of the selected layout, the field of view of first part, of the size of the second area within the video frame and a reference direction.

16 Claims, 6 Drawing Sheets

(51) Int. Cl.
*G06F 3/01* (2006.01)
*G06F 3/0481* (2013.01)
*G06T 15/20* (2011.01)
*G06T 17/20* (2006.01)
*G06T 19/00* (2011.01)
*G10L 19/008* (2013.01)
*G06T 19/20* (2011.01)
*H04H 20/95* (2008.01)
*H04N 19/70* (2014.01)

(52) U.S. Cl.
CPC .......... *G06T 3/0087* (2013.01); *G06T 3/0093* (2013.01); *G06T 15/205* (2013.01); *G06T 17/205* (2013.01); *G06T 19/006* (2013.01); *G10L 19/008* (2013.01); *H04N 21/23439* (2013.01); *A63F 2300/8082* (2013.01); *G06F 3/011* (2013.01); *G06T 19/20* (2013.01); *G06T 2219/2004* (2013.01); *H04H 20/95* (2013.01); *H04N 19/70* (2014.11)

(56) References Cited

U.S. PATENT DOCUMENTS

| | | |
|---|---|---|
| 9,167,289 B2 | 10/2015 | Stinson, III et al. |
| 2005/0271299 A1* | 12/2005 | Ajito ................. G06T 3/005 382/293 |
| 2008/0158226 A1* | 7/2008 | Shimizu ................. G02B 13/06 345/420 |
| 2010/0299630 A1* | 11/2010 | McCutchen ............. H04N 7/18 715/803 |
| 2015/0016504 A1 | 1/2015 | Auyeung et al. |
| 2015/0117524 A1 | 4/2015 | Rondao Alface et al. |
| 2015/0172544 A1 | 6/2015 | Deng et al. |
| 2015/0289032 A1* | 10/2015 | Vermolen ............. H04N 21/854 725/74 |
| 2015/0304666 A1* | 10/2015 | Seregin ................. H04N 19/70 375/240.08 |
| 2016/0012855 A1* | 1/2016 | Krishnan ............. G11B 27/105 386/241 |
| 2016/0352791 A1* | 12/2016 | Adams ................. H04L 65/4069 |
| 2017/0046820 A1* | 2/2017 | Steel ................. G06T 3/0018 |
| 2017/0078447 A1* | 3/2017 | Hancock ................. H04L 67/38 |
| 2017/0244775 A1* | 8/2017 | Ha ................. G06T 19/006 |
| 2019/0014337 A1* | 1/2019 | Skupin ................. H04N 19/34 |
| 2019/0104330 A1* | 4/2019 | Dore ................. H04N 21/23439 |

OTHER PUBLICATIONS

Choi, "Technologies under Considération for Omnidirectional Media Application Format", International Organization for Standardization. ISO/IEC JTC1/SC29/WG11, Coding of Moving Pictures and Audio, MPEG 2016/N15946, San Diego, California, USA, Feb. 2016, pp. 1-16.

Choi et al., "Use Cases and Requirements of Omnidirectional Media Format", International Organization for Standardization, ISO/IEC JTC1/SC29/WG11, Coding of Moving Pictures and Audio, MPEG 2015/M37044, Geneva, Switzerland, Oct. 2015, pp. 1-6.

Heymann et al., "Representation, Coding and Interactive Rendering of High-Resolution Panoramic Images and Video Using MPEG-4", 2005 Panoramic Photogrammetry Workshop, Berlin, Germany, Feb. 24, 2005, pp. 1-5.

Anonymous, "High Efficiency Video Coding", ITU-T H.265 Telecommunication Standardization Sector of ITU, Series H: Audiovisual and Multimedia Systems, Infrastructure of audiovisual services—Coding of moving video, Oct. 2014, pp. 1-540.

Anonymous, "Advanced Video Coding for Generic Audiovisual Services", ITU-T H.264 Telecommunication Standardization Sector of ITU, Series H: Audiovisual and Multimedia Systems, Infrastructure of audiovisual services—Coding of moving video, Jan. 2012, pp. 1-680.

Anonymous, "High Efficiency Video Coding", ITU-T H.265 Telecommunication Standardization Sector of ITU, Series H: Audiovisual and Multimedia Systems, Infrastructure of audiovisual services—Coding of moving video, Apr. 2015, pp. 1-640.

Dore et al., "Method, Apparatus and Stream Formatting an Immersive Video for Legacy and Immersive Rendering Devices", EP Patent Application EP16305321.8, filed Mar. 22, 2016, pp. 1-34.

* cited by examiner

METHOD, APPARATUS AND STREAM OF FORMATTING AN IMMERSIVE VIDEO FOR LEGACY AND IMMERSIVE RENDERING DEVICES

1. REFERENCE TO RELATED EUROPEAN APPLICATION

This application claims priority from European Patent Application No. 16305592.4, entitled "METHOD, APPARATUS AND STREAM OF FORMATTING AN IMMERSIVE VIDEO FOR LEGACY AND IMMERSIVE RENDERING DEVICES", filed on May 23, 2016, the contents of which are hereby incorporated by reference in its entirety.

2. TECHNICAL FIELD

The present disclosure relates to the domain of formatting a backward compatible stream representative of an immersive video for example when such a stream is distributed to a heterogeneous set of client devices, some of the client devices being configured to display legacy rectangular videos and some others being configured to display immersive videos.

3. BACKGROUND

A video is a sequence of at least one image. Indeed, an image can be considered as a still video. A video is encoded on a rectangular frame that is a two-dimension array of pixels (i.e. element of color information). One frame is encoded per image of the sequence. An image is encoded according to a mapping function. Legacy videos, meant to be displayed on a rectangular screen are encoded according to the rectangle mapping. Immersive videos are meant to be rendered around the viewer, i.e. the viewer is not able to see the entire picture but has to rotate his/her head (or to move or to use a controller, e.g. a joystick or a mouse) to see parts of the image out of his/her field of view. Immersive videos, when encoded on a rectangular frame, require an immersive mapping function, for example, equirectangular mapping, cube mapping or pyramidal mapping.

A video stream is prepared and formatted according to the type of rendering device that the video is meant to be rendered on. Legacy video rendering devices do not properly display immersive videos as they are configured to decode video frames only according to the rectangle mapping. Reciprocally, immersive video rendering devices do not properly display legacy videos as they expect frames encoded according to an immersive projection. There is a lack of a format for a backward compatible immersive video stream which could be properly displayed by both legacy and immersive video rendering devices.

4. SUMMARY

The purpose of the present disclosure is to overcome the lack of a format for a backward compatible immersive video stream which could be properly displayed by both legacy and immersive video rendering devices. The present disclosure relates to a method of composing a video frame for a rendering device from a video stream, the method comprising:
  Obtaining a source video frame from the video stream,
  Obtaining a first information from the video stream, said first information being representative of a size and a position of a first area of said source video frame,
  When the rendering device is a legacy video rendering device, composing said video frame with said first area of the source video frame;
  When the rendering device is an immersive video rendering device:
    Obtaining a second information from the video stream, said second information being representative of a type of a layout a field of view of said first part, a size of the second area and a reference direction,
    Building a mapped surface according to said first and second information and using said source video frame,
    Composing the video frame with at least one virtual camera capturing a portion of said mapped surface.

According to a particular characteristic the layout is based on an immersive mapping belonging to a set of immersive mapping comprising: equirectangular mapping, cube mapping and pyramidal mapping.

According to a specific embodiment, the stream is decoded according to High Efficiency Video Coding (HEVC), wherein the first information is carried by conformance window parameters and wherein the second information is carried by Supplemental Enhancement Information (SEI).

The present disclosure also relates to an apparatus configured to compose a video frame for a rendering device from a video stream, the apparatus comprising:
  Means for obtaining a source video frame from the video stream,
  Means for obtaining a first information from the video stream, said first information being representative of a size and a position of a first area of said source video frame,
  When the rendering device is a legacy video rendering device, a processor configured to compose said video frame with said first area of the source video frame;
  When the rendering device is an immersive video rendering device:
    Means for obtaining a second information from the video stream, said second information being representative of a type of a layout a field of view of said first part, a size of the second area and a reference direction,
    A processor configured to build a mapped surface according to said first and second information and using said source video frame,
    A processor configured to compose the video frame with at least one virtual camera capturing a portion of said mapped surface.

The present disclosure also relates to a method of generating a video stream from an immersive video, the method comprising:
  Encoding a first part of the immersive video frame according to a rectangle mapping;
  Encoding a second part of the immersive video frame according to a mapping transitory from said rectangle mapping to an immersive mapping;
  Encoding a third part of the immersive video frame according to said immersive mapping;
  Composing a video frame according to a layout comprising said first part as a first area, said second part as a second area and said third part as a third area;
  Generating the video stream including said built video frame, a first information relative to a size and a location of said first area and a second information containing at least the type of said layout, a field of view of said first part, a size of the second area and a reference direction.

According to a specific embodiment, the layout is based on an immersive mapping belonging to a set of immersive mapping comprising: equirectangular mapping, cube mapping and pyramidal mapping.

According to a specific characteristic, the stream is based on High Efficiency Video Coding (HEVC), wherein the first information is carried by conformance window parameters and wherein the second information is carried by Supplemental Enhancement Information (SEI).

The present disclosure also relates to an apparatus configured to generate a video stream from an immersive video and comprising:
- An encoder configured to encode a first part of the immersive video frame according to a rectangle mapping;
- An encoder configured to encode a second part of the immersive video frame according to a mapping transitory from said rectangle mapping to an immersive mapping;
- An encoder configured to encode a third part of the immersive video frame according to said immersive mapping;
- A processor configured to compose a video frame according to a layout comprising said first part as a first area, said second part as a second area and said third part as a third area;
- A video stream generator configured to generate the video stream including said built video frame, a first information relative to a size and a location of said first area and a second information containing at least the type of said layout, a field of view of said first part, a size of the second area and a reference direction.

The present disclosure also relates to a stream carrying data representative of an immersive video and comprising:
- A video frame organized according to a layout comprising a first area encoded according to a rectangle mapping, a second area encoded according to a mapping transitory from said rectangular mapping to an immersive mapping and a third area encoded according to said immersive mapping,
- A first information representative of the size and the location of said first area within the video frame,
- A second information comprising at least a type of said layout, the field of view of first part, the size of said second area within the video frame and a reference direction.

5. LIST OF FIGURES

The present disclosure will be better understood, and other specific features and advantages will emerge upon reading the following description, the description making reference to the annexed drawings wherein.

Figure 9:
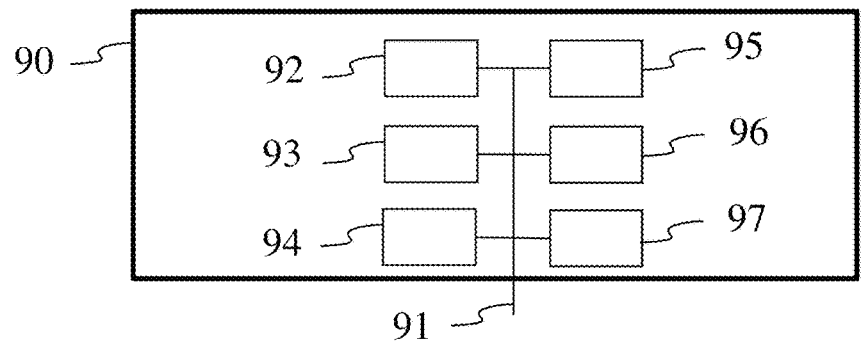
FIG. 9 shows a hardware embodiment of an apparatus configured to implement methods described in relation with FIG. 10 or 11, according to a specific embodiment of the present principles.
Figure 10:
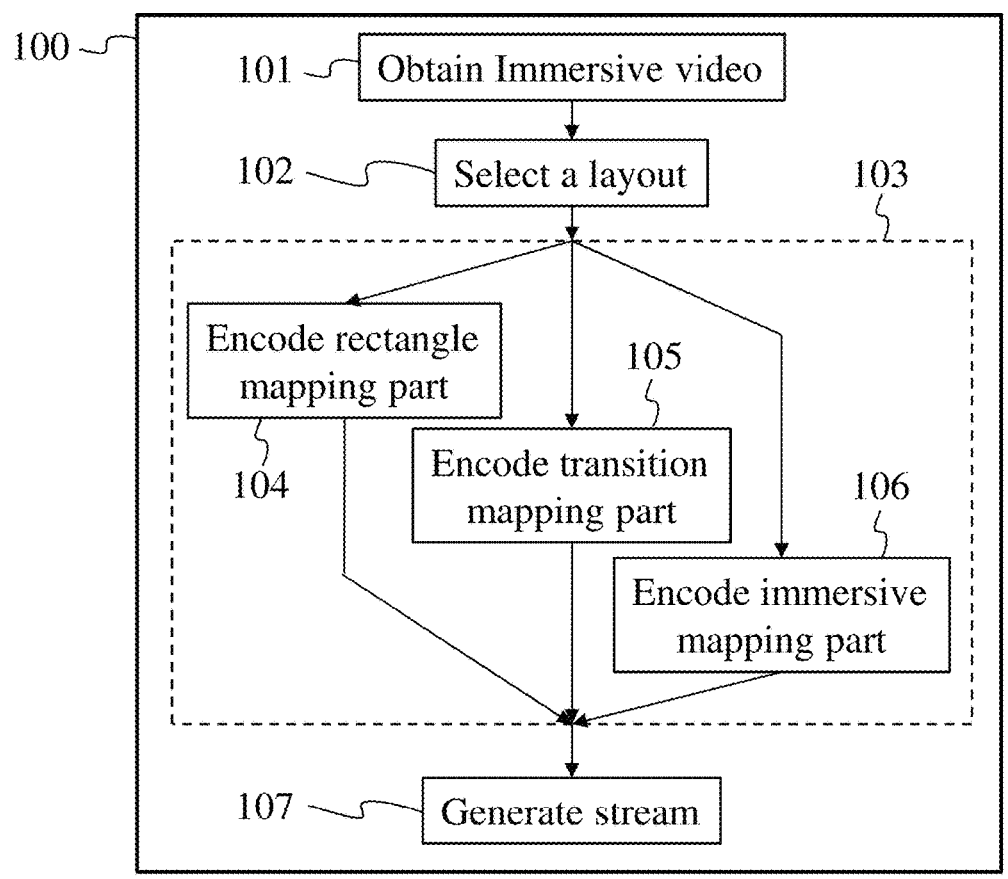
Figure 11:
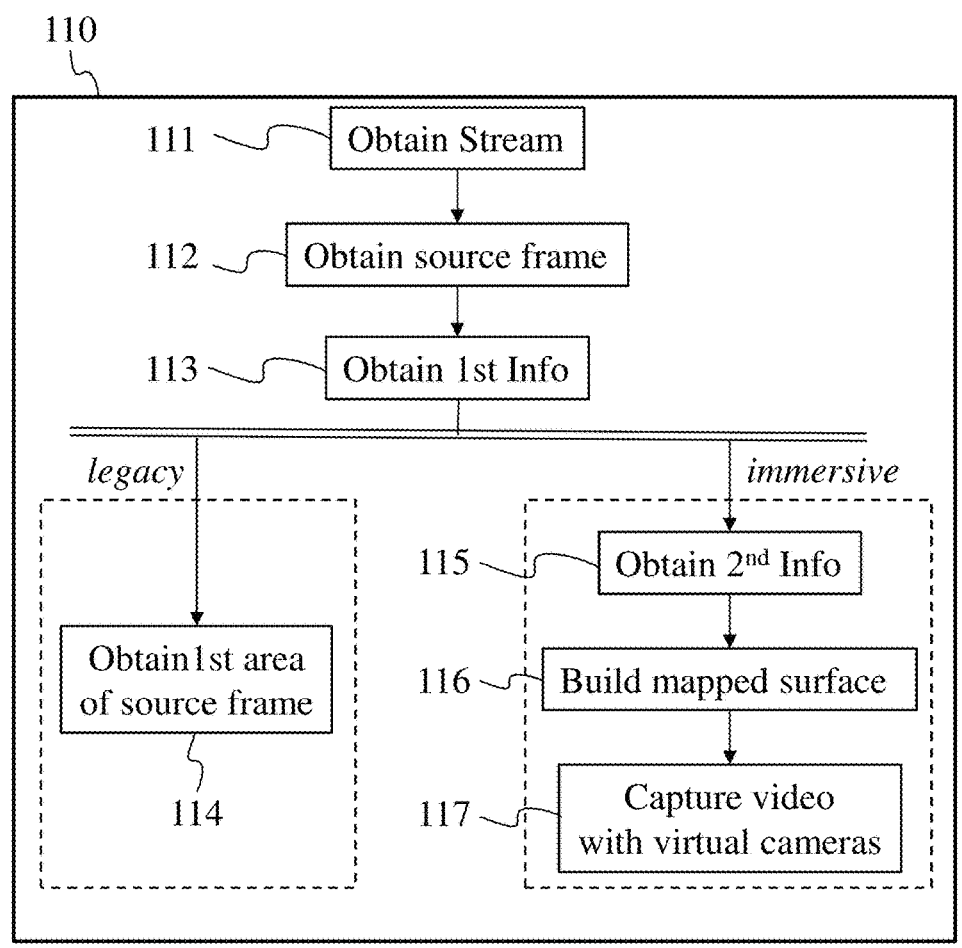

FIG. 10 diagrammatically shows an embodiment of a method of generating a backward compatible immersive video stream as implemented in a processing device of FIG. 9 such as the device according to a non-restrictive advantageous embodiment;

FIG. 11 diagrammatically shows an embodiment of a method of composing a video frame from a backward compatible immersive video stream for a given rendering device as implemented in a processing device such as the device of FIG. 9 according to a non-restrictive advantageous embodiment.

6. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It is understood that subject matter embodiments can be practiced without these specific details.

According to a non-limitative embodiment of the present disclosure, a stream encoding a backward compatible immersive video is disclosed. Methods and apparatus to decode such a stream are also disclosed. Such a stream may be decoded and rendered by legacy video rendering devices as well as by immersive video rendering devices. Such a stream is, for example, delivered from network (e.g. broadcast network, VoD network or Internet) or stored on a medium (e.g. a DVD, a Blu Ray disk or a memory stick) regardless to the device that will decode it.

A legacy video rendering device is a device capable of decoding legacy video streams encoded in standard formats such as MPEG2, H.264/AVC or H.265/HEVC. A legacy video rendering device renders the decoded video to a two-dimension rectangular screen (e.g. a TV-set, a video projector, a tablet or a smartphone). It has to be noted that rendering is the operation of preparing an image in a way that the image is properly displayable by a display device. Set-Top-Boxes and processors configured to decode a video stream are also considered as video rendering devices. In one particular embodiment, backward compatible video stream use standard parameters of H.265/HEVC and have the advantage to be decodable by existing legacy video rendering devices without prior modification.

Methods for immersive video rendering devices are further detailed in the present disclosure. Immersive videos are meant to be rendered around the viewer, i.e. the viewer is not able to see the entire picture but has to rotate his/her head (or to move) to see parts of the image out of his/her field of view. A "cave" for instance is an immersive video rendering device which is composed of several video projectors; projectors display the decoded video in several directions around the viewers. Head Mounted Display devices (HMD), tablets or smartphones, for example, may be configured to be immersive video rendering devices as they are equipped with inertial measurement units which track at least the orientation of the device in space. The device's orientation determines a direction of viewing and a virtual camera captures the part of the surrounding immersive video that has to be rendered on the rectangular screen of the device.

Methods and apparatus for generating backward compatible immersive video streams from a source immersive video are also disclosed. Video frames are encoded according to at least one mapping function. A mapping function associates each point of a mapping surface with a colour information from a frame. To be rendered, a projection function is applied to the mapping surface in order to select and/or adapt the mapped image to the screen it has to be displayed on. The mapping function is a function of the video rendering device. The projection function is associated with the display device. According to particular embodiments, the projection function is applied by the video rendering device to the mapping surface in order to prepare a frame as expected by a particular display device linked to the video rendering device.

Figure 1:
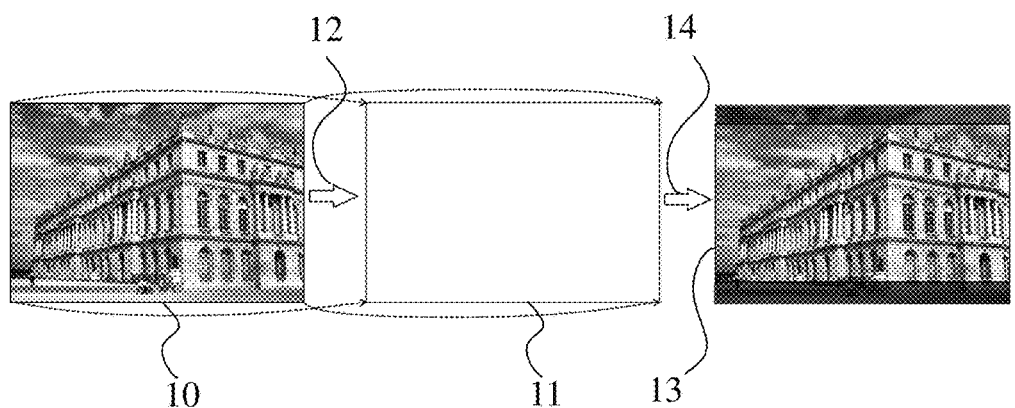
FIG. 1 illustrates the rectangle mapping encoding of a video frame, according to a specific embodiment of the present principles.

FIG. 1 illustrates the rectangle mapping encoding mode. Images of the video sequence are encoded in a rectangular frame 10 that is meant to be rendered on a rectangular surface 11. The mapping function 12 is straightforward as the frame 10 and the mapping surface 11 are equivalent. The screen 13 may not have the same resolution and/or definition as the mapping surface 11. As a consequence, the projection function 14 may rescale and/or crop or display black bars at the side of the mapping surface 11. On FIG. 1, the frame 10 and the mapping surface 11 have an aspect ratio of 4:3 while the screen has an aspect ratio of 16:9. In this example, the projection function 14 operates a cropping at the middle of the image to produce a video that fits with the screen 13. In a variant, the projection function 14 adds black bars to the left and right of the mapping surface 11 to obtain a video that fits with the screen 13. In another embodiment, the video of FIG. 1 is stereoscopic. In such a variant, the frame 10 contains two distinct images which are mapped on two distinct mapping surfaces 11. The mapping surfaces are combined according to the type of the screen to render the stereoscopic effect.

Figure 2:
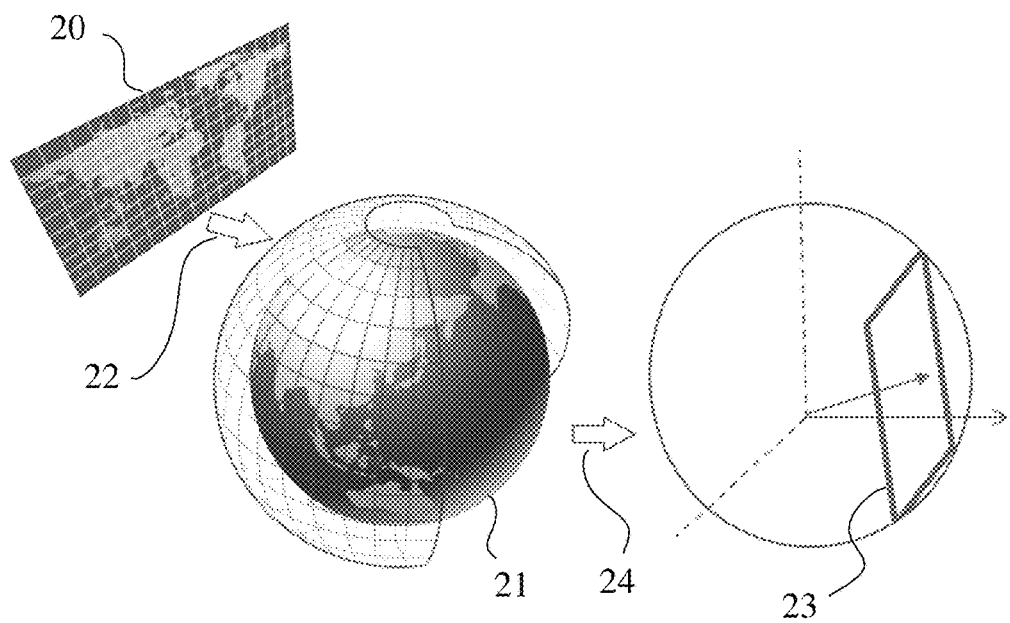
FIG. 2 shows an example of an equirectangular mapping function in comparison to the rectangle mapping of FIG. 1, according to a specific embodiment of the present principles.

FIG. 2 shows an example of an equirectangular mapping function. The sequence of images is encoded on a rectangular frame 20 meant to be mapped on a spherical mapping surface 21. The mapping function 22 establishes a mapping between each pixel of the frame 20 and a point on the mapping surface 21 (and vice versa). On FIG. 2, the mapping function 22 is based on the equirectangular projection (also called equidistant cylindrical projection). The image on the frame 20 is distorted. The distances are respected at the equator and stretched at poles. Straight lines are no longer straight and perspectives are distorted. In variants, the mapping function 22 is based on the equidistant conic projection for instance. If the screen 23 is rectangular, as for head-mounted display devices (HMD) or tablets or smartphones, a part of the mapping surface 21 is selected. The projection function 24 consists in selecting a part of the mapping surface 21 as seen by a camera located at the centre of the sphere, the camera being configured in terms of field of view and resolution in order to produce an image that directly fits with the screen 23. The chosen field of view depends on the characteristics of the display device. For HMD, advantageously, the angle of the field of view is close to the human stereoscopic vision field, which is around one hundred and twenty degrees. The aiming direction of the camera corresponds to the direction the user is looking toward and the virtual camera controller of the immersive video rendering device is used to modify the aiming direction of the camera. In a variant, the video of FIG. 2 is stereoscopic. In such a variant, the frame 20 contains two distinct images which are mapped on two distinct mapping surfaces 21. The mapping surfaces are combined according to the type of the screen to render the stereoscopic effect.

Figure 3:
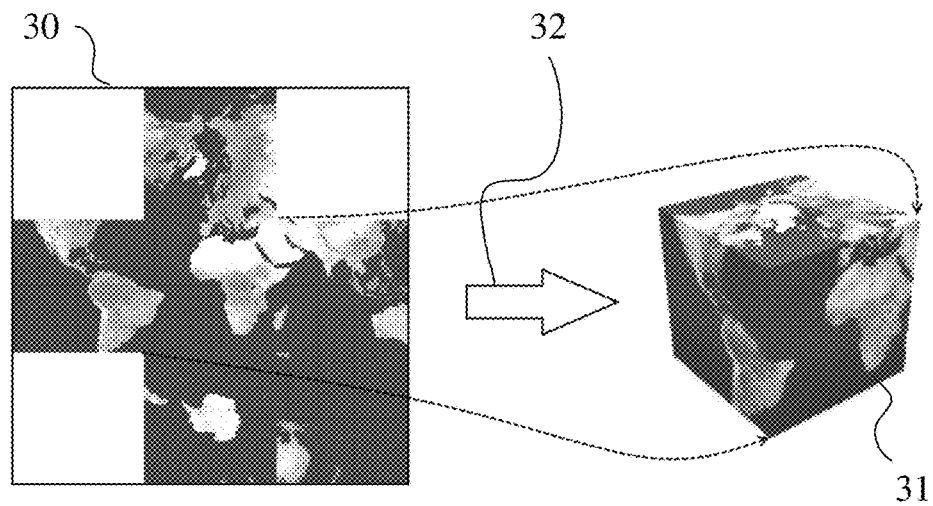
FIG. 3 illustrates an example layout of the cube mapping function versus other possible mappings of FIGS. 1 and 2, according to a specific embodiment of the present principles.

FIG. 3 illustrates an example layout of the cube mapping function. The sequence of images is encoded on a rectangular (or square) frame 30 meant to be mapped on a cubical mapping surface 31. The mapping function 32 establishes a correspondence between squares in the frame 30 and faces of the cube 31. Vice versa, the mapping function determines how the faces of the cube 31 are organized within the surface of the frame 30. Images on each face are not distorted. However, in the total image of the frame 30, lines are piece-wise straight and perspectives are broken. The image may contain empty squares (filled with default or random colour information, white on the example of FIG. 3). The projection function works as the projection function of FIG. 2. A camera is placed at the centre of the cube 31 and captures an image that fits the screen of the rendering device.

In variants, other mapping surfaces and/or mapping functions are used, mapping the video frame on a cylinder or on a pyramid for instance.

Figure 4:
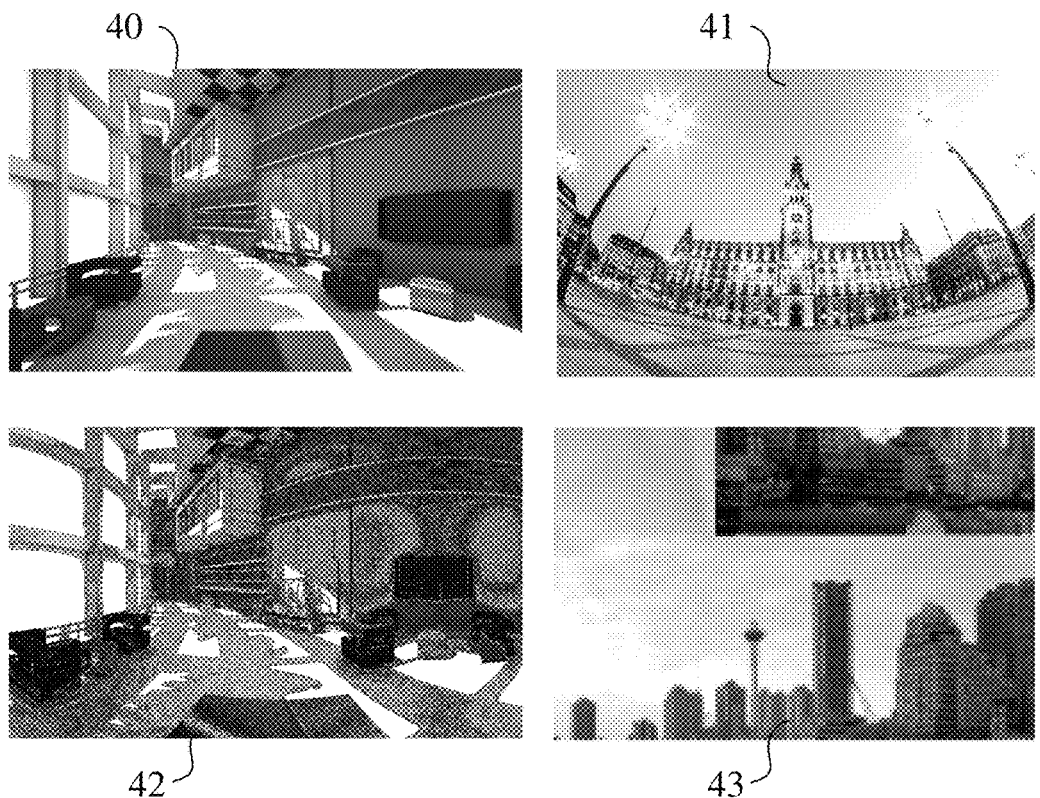
FIG. 4 shows examples of images encoded according different mappings, for example the mappings of FIGS. 1, 2 and 3, and rendered by a legacy video rendering device, according to a specific embodiment of the present principles.

FIG. 4 shows examples of images encoded according different mapping functions and rendered by a legacy video rendering device. As they are rendered by a legacy video rendering device, every images of FIG. 4 are encoded according a rectangular mapping. However, they are projected according to different projection function. Image 40 is extracted from a typical legacy video (i.e. a video that users are used to watch on TV-set on in movie theatres). The camera which captured the image 40 uses a perspective projection function. With the perspective projection, straight lines are straights, angles and proportions correspond to real ones and perspectives are obeyed. The camera captured a part of the surrounding environment. This part is called region of interest (RoI) as this is the part that the film maker has chosen to show. Horizontal field of view of a perspective rectangular image is for example seventy degrees (70°), an angle that approximately corresponds to the near peripheral human vision with a good discrimination of colours.

Image 41 has been captured with a wide-angle camera. With such a projection function, when rendered of a flat screen, straight lines are no longer straight, angles and proportions do no longer correspond to reality and perspectives are distorted. The region of interest is larger than for image 41. Horizontal field of view is over sixty degrees (60°).

Image 42 is a crop extracted from an immersive image which is encoded according to the equirectangular mapping.

The original immersive image is meant to be rendered by an immersive video rendering device according to a perspective projection (i.e. with respect to straight lines, angles, proportions and perspectives). Image 42 is a portion of an image encoded with the equirectangular mapping and decoded with rectangular mapping. As a consequence, the shown region of interest is distorted for any horizontal field of view. The distortion locally changes according to the location of the crop in the original image and according to the field of view. Image 43 is a portion of an image encoded with a cube mapping and decoding with a rectangular mapping. Here, perspective is kept but continuities are broken when the region of interest overlap edges of the cube.

Figure 5:
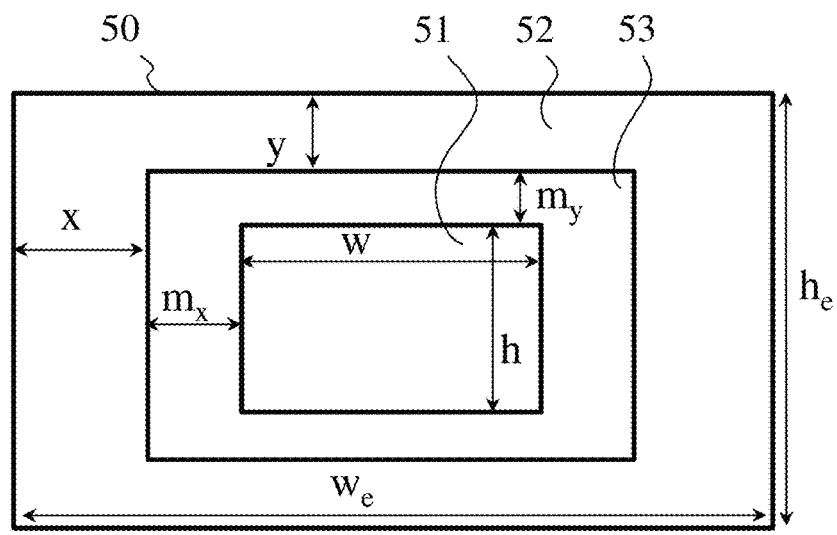
FIG. 5 illustrates an example layout of a backward compatible frame prepared for overcoming the unwanted distortion of the region of interest with the equirectangular mapping of FIG. 4, according to a specific embodiment of the present principles.

FIG. 5 illustrates an example layout 50 of a backward compatible frame prepared for overcoming the unwanted distortion of the region of interest with the equirectangular mapping. This layout 50 is a rectangular frame of a given size, for example 720×576 pixels (PAL definition), 720×480 (NTSC definition), 1280×720 (HD1 definition), 1920×1080 pixels (HD2 definition), or 4096×2160 (4K). The layout 50 is composed of three (3) parts.

The part 51 corresponds to a region of interest of a source immersive content, captured for example according to a perspective projection and encoded according to the rectangular mapping. This sub-frame 51 is prepared to be rendered on legacy video rendering devices. The size of the sub-frame 51 is of a given definition, for example 1920×1080 pixels if the frame 50 is a 4K frame. The top left corner of the sub-frame 51 is located at a position (x,y) within the frame 50, for example x=1088 and y=540. The size and position of the sub-frame 51 are constant over the duration of the video. In a variant, the size and/or the position of the sub-frame 51 vary over the time.

The part 52 is a rectangular frame encoding the source immersive content according to the equirectangular mapping. The area corresponding to the part 53 is cut out from this frame. The part 53 is a transition area where the image is continuously going from the rectangle mapping (on its central side) to the equirectangular mapping (on its peripheral side).

Figure 6:
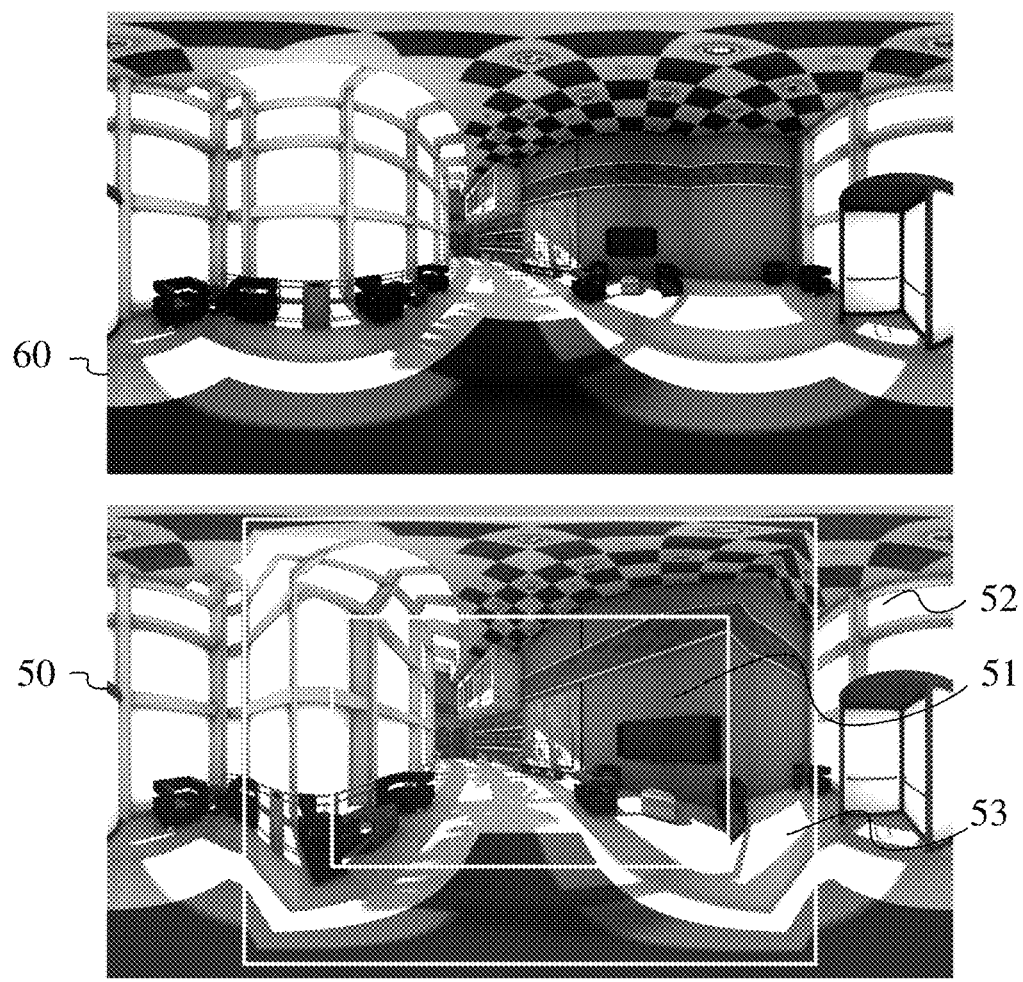
FIG. 6 shows an example of a transformation of an immersive frame encoded according to an equirectangular mapping into a backward compatible frame encoded with the example layout of FIG. 5, according to a specific embodiment of the present principles.

FIG. 6 shows an example of a transformation of an immersive frame 60 encoded according to the equirectangular mapping into a backward compatible frame 50 encoded with the example layout of FIG. 5. A region of interest is selected, for example, manually by the director or, for instance, automatically using an image processing algorithm based, for example, on the saliency map of the image. The region of interest corresponds to a portion of the field of view of the immersive content (which is up to 360°). As discussed above, if a perspective projection is chosen for the region of interest, the field of view is up to seventy degrees. In a variant, a wide angle is chosen as the projection function of the region of interest.

In the following example, the position (x,y) of the sub-frame 51 within the frame 50 has been chosen in order to have the sub-frame 51 in the middle of the frame. In variants of this example, equations can be adapted by translating the frame of reference.

Given a horizontal field of view, the vertical field of view is determined by the following equation:

$$fov_v = \operatorname{atan}\left(\frac{h}{w}\tan\left(\frac{fov_h}{2}\right)\right)*2 \quad [\text{eq. 1}]$$

Where w and h are respectively the width and the height of the sub-frame 51. For a point $M_e$ $(i_e, j_e)$ of the frame 50, a coordinate $M_s$ in the sub-frame 51 is determined according to equation [eq. 2]:

$$M_s = \begin{bmatrix} i_e - \frac{h_e}{2} + \frac{h}{2} \\ j_e - \frac{w_e}{2} + \frac{w}{2} \end{bmatrix} \quad [\text{eq. 2}]$$

Where $w_e$ and $h_e$ are respectively the width and the height of the frame 50. For each pixel $M_s(i,j)$ of the sub-frame 51, an associated 3D point $M_v$ is computed ([eq. 3]). The coordinate M of the corresponding pixel in the frame 60 by projecting the normalization of the point on the sphere ([eq. 4]).

$$M_v = \begin{bmatrix} -1 \\ \left(\frac{\frac{w}{2}-j}{w}\right)*\tan\left(\frac{fov_h}{2}\right)*2 \\ \left(\frac{\frac{h}{2}-i}{h}\right)*\tan\left(\frac{fov_v}{2}\right)*2 \end{bmatrix} \quad [\text{eq. 3}]$$

$$M = f^{-1}\left(\partial^{-1}\left(\frac{M_v}{\|M_v\|}\right)\right) \quad [\text{eq. 4}]$$

The function f is the function for mapping from the image space to an intermediate parametric space of the surface. For example, for an equirectangular mapping, the function f may be defined as:

$$f: (i,j) \rightarrow (\theta,\varphi) \quad [\text{eq. 4a}]$$

$$\varphi = (i-h/2)/h * 2\pi$$

$$\theta = (j-w/2)/w * \pi$$

The function ∂ is the function for mapping from the intermediate parametric space to the 3D space of the surface. For an equirectangular mapping, the 3D surface is a sphere and delta may be defined as:

delta: $(\theta,\varphi) \rightarrow (X,Y,Z)$ $X = \sin(\varphi)\cos(\theta)$ $Y = \sin(\varphi)\sin(\theta)$ $Z = \cos(\varphi)$ If the field of view of the sub-frame 51 is smaller than the part of the field of view of the immersive frame 50, 60 occupied by the sub-frame 51, pixels are "compressed" in the transition area 53. This is the case in the example of FIG. 6 where the horizontal field of view of the sub-frame 51 is sixty degrees when the space occupied by the sub-frame 51 is 168.75 degrees (1920×360/4096). At the opposite, if the field of view of the sub-frame 51 is larger than the part of the field of view of the immersive frame 50, 60 occupied by the sub-frame 51, pixels are "stretched" in the transition area 53.

An example method to fill the transition area 53 is to compute a smooth interpolation from the rectangle mapping sub-frame 51 to the equirectangular mapping part 52; for example by determining a weight according to a distance between the two portions 51 and 52 of the frame.

$$\begin{cases} (i,j) \in \text{part } 51, \omega = 0 \\ (i,j) \notin \text{part } 53, \omega = 1 \\ (i,j) \in \text{part } 53, (i,j) \notin \text{part } 51, \\ \max\left(\dfrac{\left|i_e - \dfrac{h_e}{2}\right| - \dfrac{h}{2}}{m_y}, \dfrac{\left|j_e - \dfrac{w_e}{2}\right| - \dfrac{w}{2}}{m_x}\right) \end{cases}$$ [eq. 5]

Where $m_x$ and $m_y$ are respectively the width and the height of the margins defining the part 53 around the sub-frame 51. Coordinates of a point on the sphere are computed according to a function of the weight ([eq. 6]) and coordinates of the pixel of the frame 60 to use is obtained by equation [eq. 7].

$$M'_t = (1 - h(\omega))\left(\partial^{-1}\left(\dfrac{M_v}{\|M_v\|}\right)\right) + h(\omega) \cdot f(M_e) \quad [\text{eq. 6}]$$

$$M = f^{-1}(M'_t) \quad [\text{eq. 7}]$$

The function h is used to modulate the slope of the transition between the two mappings. Given a positive constant α greater or equal to 1, the function h is, for example one of the followings:

$$h(x) = x^\alpha$$

$$h(x) = \sin\left(\dfrac{\pi}{2}x\right)$$

In another embodiment, the smooth interpolation is performed in the three-dimension (3D) space instead of in the parametric surface as detailed above.

Figure 7:
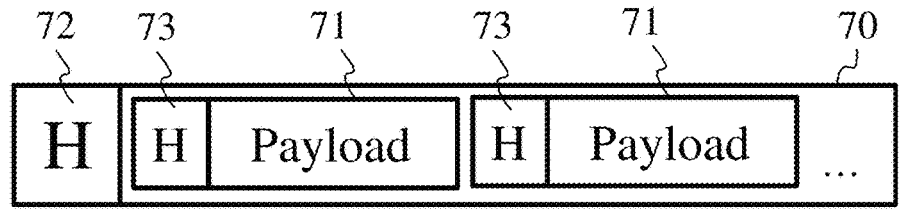
FIG. 7 illustrates a particular embodiment of the data structure of a stream carrying data representative of a backward compatible immersive video including a video frame as illustrated on FIGS. 5 and 6, according to a specific embodiment of the present principles.

FIG. 7 illustrates a particular embodiment of the data structure of a stream 70 carrying data representative of a backward compatible immersive video including a video frame as illustrated on FIGS. 5 and 6. The frame 50 of FIGS. 5 and 6 is encoded in the payload parts 71 of the stream. Global or generic information relative to the content is included in a header part 72. Changing or repetitive information is stored the header part 73 of each payload part 71.

The frame 50 contains a sub-frame 51 which is adapted to legacy video rendering device. The only information these devices need to decode the sub-frame 51 is its location and size within the frame 60, also called first information in this document. As the first information may change over the time or because the content header may not have been received by the client device (e.g. in broadcast cases), the first information is included in the header part 73 of each payload part 71. In a variant, the first information is included in the content header part 72. In another variant, the first information is included in header 73 part of payloads parts 71 only when changing or repetitively, for example once every 5 or 10 payload part 71.

In a particular embodiment, the frame 50 is encoded according to H.265/HEVC codec (see document ETSI TS 101 154 v2.2.1 of DVB standard). Parameters "window conformance" of this codec are reserved for carrying the information of location and size of a sub-frame in a main frame. When present in the stream, the use of the conformance window parameters by the rendering device is mandatory in the specifications of DVB standard. The aspect ratio adaptation is managed by the legacy video rendering device as usual, without prior modification of the device.

When decoded by an immersive video rendering device (e.g. a tablet, a smartphone or a HMD), the inverse transformation of the frame 50 is performed in order to retrieve the frame 60. In the example of FIG. 6, the inverse transformation may be based on the inverse functions of [eq. 8] and [eq. 9]:

$$\partial^{-1}: M^\partial \to M' \quad [\text{eq. 8}]$$
$$\theta = \text{atan}\left(\dfrac{Y}{X}\right) + \pi$$
$$\varphi = -\text{atan}\left(\dfrac{\sqrt{X^2 + Y^2}}{Z}\right) + \dfrac{\pi}{2}$$

$$f^{-1}: M'(\theta, \varphi) \to M(x, y) \quad [\text{eq. 9}]$$
$$x = \theta$$
$$y = \varphi$$

Parameters required for this inverse transformation are the same than the one needed for the transformation: on one hand, the first information, that contains the location and the size of the sub-frame 51, and on the other hand, the second information that contains: the type of mapping layout used to prepare the frame 50 (the one of FIG. 5 in this example), the field of view used to compute the sub-frame 51, the size of the transition area and a reference direction; the location of the transition area is correlated to the type of mapping layout. The reference direction might be useful in order to know, in immersive viewing the absolute zero position of the mapping surface when rendering. The second information is constant over the time and, for this reason is encoded in the header part 72 of the content. In another embodiment, for example when the stream is broadcasted, the content header 72 may be missed by the client; as a consequence, the second information is repetitively encoded in the stream, for example in the header part 73 of the payload parts 71. In a variant, some data of the second information (e.g. the size of the transition area) may change over the time, and, for this reason, the second information is encoded in the header part 73 of the payloads parts 71 of the stream.

Reconstructed frame 60 is then mapped on a sphere and the immersive video rendering device is using its regular projection function to render the part of the immersive content to display. In another embodiment, the immersive video rendering device built a mapping surface specific to the frame 50 according to said first and second information. For example the specific mapping surface is composed of a plane (for the sub-frame 51), an elliptic portion (for the transition part 53) and a partially spherical part (for the equirectangular part 52). The frame 50 is mapped on the specific mapping surface, the regular projection function of the immersive video rendering device automatically cut out a part of the immersive content adapted to the at least one screen associated with the device.

In a particular embodiment, the frame 50 and the first and second information are encoded in separate synchronized streams.

Figure 8:
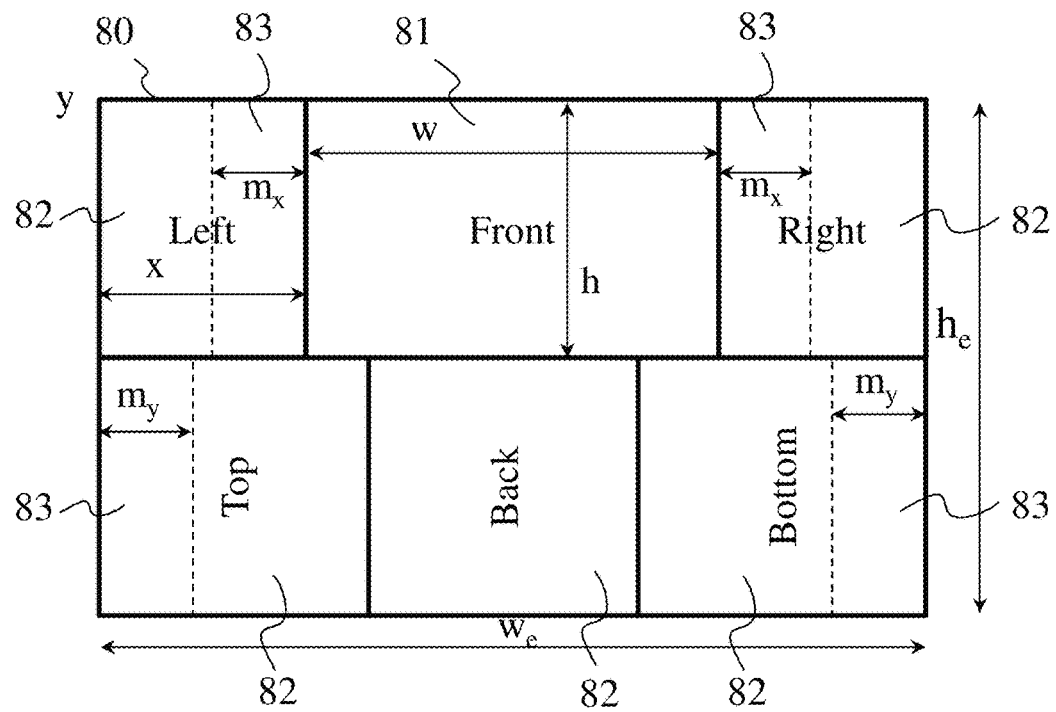
FIG. 8 illustrates an example layout of a backward compatible frame prepared for overcoming the unwanted discontinuities in the region of interest with the cube mapping of FIG. 3, according to a specific embodiment of the present principles.

FIG. 8 illustrates an example layout 80 of a backward compatible frame prepared for overcoming the unwanted discontinuities in the region of interest with the cube mapping. In this example layout, the size and the ratio of each face of the 3D surface is adapted. For the same reasons than for the example equirectangular layout of FIGS. 5 and 6, a sub-frame 81 is prepared in order to be directly decodable by legacy video rendering devices. This example layout 80 is a rectangular frame of a given size, for example 720×576 pixels (PAL definition), 720×480 (NTSC definition), 1280× 720 (HD1 definition), 1920×1080 pixels (HD2 definition), or 4096×2160 (4K). The six faces of the cube compose the three (3) parts of the layout: the rectangle mapping part 81, the immersive mapping part 82 and the transition mapping area 83.

The part 81 corresponds to a region of interest of a source immersive content, captured for example according to a perspective projection and encoded according to the rectangular mapping. The region of interest occupies one face of the cube. The size of the sub-frame 51 is of a given definition, for example 1920×1080 pixels if the frame 80 is a 4K frame. Such standard sizes have the advantage to be decoded and rendered by existing legacy video rendering device without prior modification. However, as they are rectangle (and not square), the size of the other faces of the cube in the mapping layout has to be adapted. On the example of FIG. 8, the part 81 is seen as the front face (by convention) and occupy the half of the width of the frame 80 and the half of its height. Top, bottom and back faces keep a square shape. Left and right faces are rectangles smaller than the bottom face for example. In an immersive cube mapping, each face of the cube receive ninety degrees (90°) of the horizontal field of view (which is of 360°) and ninety degrees of the vertical field of view. In the example backward compatible layout of FIG. 8, the fov of the front face corresponds to the fov of the region of interest. If this fov is smaller than 90°, Left, right, top and bottom faces have to encode more than 90° of fov on a smaller area for left and right faces. As a consequence, pixels are "compressed" in a transition area 83 distributed on said four faces. The remaining of the frame 80 is used to encode the immersive frame according to the cube mapping.

A backward compatible immersive video prepared with the layout of FIG. 8 is encoded in a stream as depicted in FIG. 7 for the layout of FIG. 5. The prepared frame is encoded in the payload part 71 of the stream 70. A first information containing the location and the size of the sub-frame 81 is encoded according to the same variants in header parts 73 of the payloads parts 71 and/or in the header part 72 of the content. A second information containing: the type of mapping layout used to prepare the frame 50 (the one of FIG. 8 in this example), the field of view used to compute the sub-frame 81, the size of the transition area and the reference direction; the location of the transition area is correlated to the type of mapping layout.

FIG. 9 shows a hardware embodiment of an apparatus 70 configured to implement methods described in relation with FIG. 10 or 11. In this example, the device 90 comprises the following elements, connected to each other by a bus 91 of addresses and data that also transports a clock signal:
  a microprocessor 92 (or CPU), which is, for example, a DSP (or Digital Signal Processor);
  a non-volatile memory of ROM (Read Only Memory) type 93;
  a Random Access Memory or RAM (94);
  an I/O interface 95 for reception of data to transmit, from an application; and
  a graphics card 96 which may embed registers of random access memory;
  a power source 97.

In accordance with an example, the power source 97 is external to the device. In each of mentioned memory, the word «register» used in the specification may correspond to area of small capacity (some bits) or to very large area (e.g. a whole program or large amount of received or decoded data). The ROM 93 comprises at least a program and parameters. The ROM 93 may store algorithms and instructions to perform techniques in accordance with present principles. When switched on, the CPU 92 uploads the program in the RAM and executes the corresponding instructions.

RAM 94 comprises, in a register, the program executed by the CPU 92 and uploaded after switch on of the device 90, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), set-top-boxes and other devices that facilitate communication of information between end-users.

In accordance with an example of generating a backward compatible immersive video stream as illustrated on FIG. 10, a source immersive video and data representative of a region of interest of the source immersive video are obtained from a source. For example, the source belongs to a set comprising:
  a local memory (93, 94 or 96), e.g. a video memory or a RAM (or Random Access Memory), a flash memory, a ROM (or Read Only Memory), a hard disk;
  a storage interface (95), e.g. an interface with a mass storage, a RAM, a flash memory, a ROM, an optical disc or a magnetic support; and
  a communication interface (95), e.g. a wireline interface (for example a bus interface, a wide area network interface, a local area network interface) or a wireless interface (such as a IEEE 802.11 interface or a Bluetooth® interface).

According to one particular embodiment, the algorithms implementing the steps of a method of generating a backward compatible immersive video stream and described hereafter in FIG. 10 are stored in a memory GRAM of the graphics card 96 associated with the device 90 implementing these steps. According to a variant, a part of the RAM (94) is assigned by the CPU (92) for storage of the algorithms. These steps lead to the generation of a video stream that is sent to a destination belonging to a set comprising a local memory, e.g. a video memory (94), a RAM (94), a ROM (93), a flash memory (93) or a hard disk (93), a storage interface (95), e.g. an interface with a mass storage, a RAM, a ROM, a flash memory, an optical disc or a magnetic support and/or received from a communication interface (95), e.g. an interface to a point to point link, a bus, a point to multipoint link or a broadcast network.

In accordance with examples, device 90 being configured to implement a method of generating a backward compatible immersive video stream described in relation with FIG. 10, belongs to a set comprising:
  a mobile device;
  a communication device;
  a game device;

a tablet (or tablet computer);
a laptop;
an encoding chip;
a still picture server; and
a video server (e.g. a broadcast server, a video-on-demand server or a web server).

In accordance with an example of the composing a video from a backward compatible immersive video stream, a stream representative of a backward compatible immersive video is obtained from a source. Exemplarily, the stream is read from a local memory, e.g. a video memory (94), a RAM (94), a ROM (73), a flash memory (93) or a hard disk (93). In a variant, the stream is received from a storage interface (95), e.g. an interface with a mass storage, a RAM, a ROM, a flash memory, an optical disc or a magnetic support and/or received from a communication interface (95), e.g. an interface to a point to point link, a bus, a point to multipoint link or a broadcast network.

According to one particular embodiment, the algorithms implementing the steps of a method of composing a video from a backward compatible immersive video stream for a rendering device and described hereafter in FIG. 11 are stored in a memory GRAM of the graphics card 96 associated with the device 90 implementing these steps. According to a variant, a part of the RAM (94) is assigned by the CPU (92) for storage of the algorithms. These steps lead to the composition of a video that is sent to a destination belonging to a set comprising:
a mobile device;
a communication device;
a game device;
a set-top-box;
a TV set;
a tablet (or tablet computer);
a laptop;
a display and
a decoding chip.

FIG. 10 diagrammatically shows an embodiment of a method 100 of generating a backward compatible immersive video stream as implemented in a processing device such as the device 90 according to a non-restrictive advantageous embodiment.

At a step 101, an immersive video and data representative of a region of interest of the immersive video are obtained from a source. The immersive video contains a frame encoded according to an immersive mapping, for example the equirectangular mapping (as the frame 60 of FIG. 6), the cube mapping (as the frame 30 of FIG. 3 for instance) or the pyramid mapping. The immersive video may contain other data which are used without modification when generating the backward compatible immersive video stream such as audio-tracks or metadata.

At a step 102, a layout is selected for the preparation of the backward compatible frame, for example, a layout based on the equirectangular mapping as on FIG. 5, or a layout based on the cube mapping as the one of FIG. 8 or a layout based on a pyramidal mapping.

A step 103 consists in building the backward compatible frame. This step contains three sub-steps 104, 105 and 106. These three sub-steps may be executed sequentially or in parallel. The step 104 consists in encoding a frame according to the rectangle mapping. This step 104 is common to every layouts as it produces the part of the frame that is backward compatible. Colour information (i.e. pixels) of the frame are determined from the immersive video frame according to the description of the region of interest. The step 105 and 106 consists in preparing the part of the immersive video that is out of the region of interest. The immersive mapping of the layout may be different from the immersive mapping of the immersive video. A size of the transition area is determined. The location of the transition area depends on the selected layout. The transition area continues the backward compatible frame. At step 105, colour information of the transition area is determined. The mapping used for this part is continuously transitory from the rectangle mapping to the immersive mapping of the layout. At step 106, colour information of the immersive part is determined. The three area corresponding to the three parts of the immersive video frame are used to compose the backward compatible frame according to the selected layout. The values determined for the execution of the step 103 are transmitted as an entry of the step 107. These values are: the size and location of the first area, the type of the layout, the field of view of the first part, the size of the transitory area and the direction of the absolute zero position of the mapping surface when rendering, also called reference direction.

A step 107 consists in the generation of the backward compatible immersive video stream. The stream contains the backward compatible video frame, a first information relative to the size and the location of the first area and a second information comprising the type of the layout, the field of view of the first part, the size of the transitory area and the reference direction.

FIG. 11 diagrammatically shows an embodiment of a method 110 of composing a video frame from a backward compatible immersive video stream for a given rendering device as implemented in a processing device such as the device 90 according to a non-restrictive advantageous embodiment. The rendering device is either a legacy video rendering device, such as a TV-Set, a tablet or a smartphone, or an immersive video rendering device, such as a cave, a HMD or a tablet or a smartphone configured to render immersive videos. First three steps of the method are common to both types of rendering devices.

At a step 111, the stream is obtained from a source. As the stream is backward compatible, it can be parsed by standard legacy video rendering device without prior modification. At step 112, the video frame of the stream is obtained. According to an embodiment, the frame is decoded at this step. In another embodiment, encoded data of the frame are accessed and kept encoded. Such an embodiment is useful for legacy video rendering device for which only the first area of the frame will be decoded at step 114. Such an embodiment may be implemented, for example, by the use of tiles. Independent tiles are a feature of HEVC in which dedicated Supplemental Enhancement Information (SEI) is reserved to signalize the size and location of tiles to be decoded independently each from the others. At step 113, the first information comprising the size and the location of the first area is parsed from the stream.

At this point, if the rendering device is a legacy video rendering device, the part of the frame corresponding to the first area is used to compose the frame to be rendered. As the first area is encoded according to a rectangle mapping, a legacy video rendering device can render it without prior modification. According to an embodiment, the frame is cropped according to the first information in order to keep only the first area. According to another embodiment, only the part of the first area is decoded by using, for example, the tile feature.

If the rendering device is an immersive video rendering device, the second information is parsed from the stream at a step 115. This information is used, in addition to the first information to build a mapped surface at a step 116. According to an embodiment, a mapping surface is selected, for example a sphere, a cube or a pyramid. This mapping surface is, for example a mesh associated with texture coordinates. These textures coordinates are computed in order to match the input frame. In a variant, the vertices of the mesh are displaced in order to make their position match with the position their texture coordinates address in the input frame. In another variant, an intermediate frame is computed in order that the frame matches with the texture coordinates of the mapping surface.

The step 117 consists in capturing the videos to be rendered from virtual cameras placed at the center of the mapped surface. This is a regular step of immersive video rendering devices. At least one virtual camera is placed at the center of the mapped surface and captures a frame meant to be transmitted a projection device. For Head Mounted Devices, the projection device is the screen of the device. For caves, each of light projectors is a projection device.

Naturally, the present disclosure is not limited to the embodiments previously described.

In particular, the present disclosure is not limited to a method of processing an immersive video content but also extends to any method of displaying the processed video frame and to any device implementing this displaying method. The implementation of calculations necessary to generate the frame and the stream is not limited either to an implementation in shader type microprograms but also extends to an implementation in any program type, for example programs that can be executed by a CPU type microprocessor. The use of the methods of the present disclosure is not limited to a live utilisation but also extends to any other utilisation, for example for processing known as postproduction processing in a recording studio.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of composing a video frame for a rendering device from a video stream, comprising:
obtaining a first information from the video stream, said first information being representative of a size and a position of a first area in a source video frame obtained from the video stream, said first area being a rectangle;
decoding said first area according to a rectangle mapping;
in case the rendering device is an immersive video rendering device:
obtaining a second information from the video stream, said second information being representative of a type of a layout, a field of view of said first area, a size of a second area of the source video frame and a reference direction, decoding the second area according to a mapping transitioning from said rectangle mapping to an immersive mapping by using said first and second information;

decoding a third area of the source video frame according to said immersive mapping by using said first and second information; and composing the video frame with said first, second and third decoded areas.

2. The method according to claim 1 wherein said layout is based on an immersive mapping belonging to a set of immersive mapping comprising: equirectangular mapping, cube mapping and pyramidal mapping.

3. The method according to claim 1 wherein the first information is carried by conformance window parameters and wherein the second information is carried by Supplemental Enhancement Information (SEI).

4. An apparatus configured to compose a video frame for a rendering device from a video stream, comprising:

a processor configured to execute instructions stored in a memory, the instructions comprising:

obtaining a first information from the video stream, said first information being representative of a size and a position of a first area in a source video frame obtained from the video stream, said first area being a rectangle, and decoding said first area according to a rectangle mapping;

in case the rendering device is an immersive video rendering device:

obtaining a second information from the video stream, said second information being representative of a type of a layout, a field of view of said first area, a size of a second area of the source video frame and a reference direction, decoding the second area according to a mapping transitioning from said rectangle mapping to an immersive mapping by using said second information; and decoding a third area of the source video frame according to said immersive mapping by using said second information; and composing the video frame with said first, second and third decoded areas.

5. The apparatus according to claim 4 wherein said layout is based on an immersive mapping belonging to a set of immersive mapping comprising: equirectangular mapping, cube mapping and pyramidal mapping.

6. The apparatus according to claim 4 wherein the first information is carried by conformance window parameters and wherein the second information is carried by Supplemental Enhancement Information (SEI).

7. The apparatus of claim 4, said apparatus belonging to a set of apparatus comprising a mobile device, a communication device, a game device, a tablet computer, a laptop, an encoding chip, a still picture server, a video server, a broadcast server, a video-on-demand server and a web server.

8. A method of generating a video stream from an immersive video frame, comprising:

encoding a first part of the immersive video frame according to a rectangle mapping;

encoding a second part of the immersive video frame according to a mapping transitioning from said rectangle mapping to an immersive mapping;

encoding a third part of the immersive video frame according to said immersive mapping;

composing a video frame according to a layout comprising said first part as a first area, said second part as a second area and said third part as a third area, said first area being a rectangle;

generating the video stream including said composed video frame, a first information comprising a size and a location of said first area and a second information containing at least the type of said layout, a field of view of said first part, a size of the second area and a reference direction.

9. The method according to claim 8 wherein said layout is based on an immersive mapping belonging to a set of immersive mapping comprising: equirectangular mapping, cube mapping and pyramidal mapping.

10. The method according to claim 8 wherein the first information is carried by conformance window parameters and wherein the second information is carried by Supplemental Enhancement Information (SEI).

11. An apparatus configured to generate a video stream from an immersive video frame, comprising:

a processor configured to execute instructions stored in a memory, the instructions comprising:

encoding a first part of the immersive video frame according to a rectangle mapping;

encoding a second part of the immersive video frame according to a mapping transitioning from said rectangle mapping to an immersive mapping;

encoding a third part of the immersive video frame according to said immersive mapping;

composing a video frame according to a layout comprising said first part as a first area, said second part as a second area and said third part as a third area, said first area being a rectangle;

generating the video stream including said composed video frame, a first information comprising a size and a location of said first area and a second information containing at least a type of said layout, a field of view of said first part, a size of the second area and a reference direction.

12. The apparatus according to claim 11 wherein said layout is based on an immersive mapping belonging to a set of immersive mapping comprising: equirectangular mapping, cube mapping and pyramidal mapping.

13. The apparatus according to claim 11 wherein the first information is carried by conformance window parameters and wherein the second information is carried by Supplemental Enhancement Information (SEI).

14. A non-transitory medium storing data representative of an immersive video, said data comprising:

a video frame organized according to a layout comprising a first area encoded according to a rectangle mapping, a second area encoded according to a mapping transitioning from said rectangle mapping to an immersive mapping and a third area encoded according to said immersive mapping, said first area being a rectangle;

a first information representative of a size and a location of said first area within the video frame, and a second information comprising at least a type of said layout, a field of view of said first area, a size of said second area within the video frame and a reference direction.

15. The non-transitory medium according to claim 14 wherein said layout is based on an immersive mapping belonging to a set of immersive mapping comprising: equirectangular mapping, cube mapping and pyramidal mapping.

16. The non-transitory medium according to claim 14 wherein the first information is carried by conformance window parameters and wherein the second information is carried by Supplemental Enhancement Information (SEI).

* * * * *